3,629,325
CLEAVING POLY(ALKYLENE OXIDES) WITH
ACID ANHYDRIDES
Hideo Tomomatsu, Austin, Tex., assignor to Jefferson
Chemical Company, Inc., Houston, Tex.
No Drawing. Filed Feb. 28, 1969, Ser. No. 803,446
Int. Cl. C07c 41/02, 67/00
U.S. Cl. 260—496                            10 Claims

ABSTRACT OF THE DISCLOSURE

Poly(alkylene oxide) diacetates are obtained by cleaving poly(alkylene oxides) with acetic anhydride in the presence of acetic acid or aluminum chloride. The poly(alkylene oxide) diacetates are alcholyzed to poly(alkylene oxide) diols. Isotactic poly(alkylene oxide) diols are particularly useful reactants in the synthesis of polyurethanes. Polyurethanes are prepared by reacting a poly(alkylene oxide) diol with an organic polyisocyanate or polyisothiocyanate. Such polyurethanes are especially useful as surface coatings.

BACKGROUND OF THE INVENTION

Field of the invention

The invention pertains to the field of organic chemistry wherein reactants for polyurethanes are synthesized.

Description of the prior art

Merriman's British Patent 1,059,344 (1967) discloses the use of an $O_3$–$O_2$ mixture to cleave poly(propylene oxide) and the dicarboxylic acids obtained are reduced to diols by lithium aluminum hydride. Belgian Patent 672,649 discloses cleaving poly(propylene oxide) by refluxing with $H_3PO_4$ solution. Vandenberg's U.S. Patents 3,310,504 (1967) and 3,337,476 (1967) disclose cleaving poly(propylene oxide) with organolithium compounds.

SUMMARY OF THE INVENTION

The invention is a method for cleaving poly(alkylene oxides) and a method for synthesizing diols therefrom. Poly(alkylene oxide) diacetates are synthesized by cleaving poly(alkylene oxide) with acetic anhydride. A catalyst of a Brønsted or Lewis acid, preferably acetic acid or aluminum chloride, is beneficial to the cleavage. The poly(alkylene oxide) diacetates are alcoholyzed with alcohols and the resulting diols can be used as reactants with organic polyisocyanates or polyisothiocyanates to synthesize polyurethanes.

DESCRIPTION OF THE PREFERRED EMBODIMENTS

I have discovered that isotactic poly(propylene oxide) diacetate in the molecular weight range of about 1,000 to 32,000 can be prepared by cleaving higher molecular weight isotactic poly(alkylene oxide) with acetic anhydride, preferably in the presence of a catalyst of acetic acid or aluminum chloride. Generally, isotactic poly(propylene oxide) polymerized by known methods has a molecular weight in the range of 100,000 to 4,000,000 and the terminal groups are usually obscure in such high molecular weight isotactic poly(propylene oxide). For use as reactants in the synthesis of polyurethanes, it is desirable to have poly(propylene oxide) diols in the molecular weight range of about 1,000–32,000. These molecular weights are obtained by using the synthesis of my invention. Isotactic diols are particularly useful in the synthesis of rigid and semirigid polyurethanes. Polyurethanes synthesized from isotactic diols are very tough and, hence, quite useful at ordinary temperatures. The poly(alkylene oxides) cleaved in the process of this invention are derived from alkylene oxides, for example, ethylene oxide, propylene oxide and isobutylene oxide. The following examples illustrate my invention in more detail. Example I illustrates the synthesis of poly(propylene oxide) diacetate from poly(propylene oxide) using no catalyst. The remaining examples illustrate the use of the catalysts acetic acid or aluminum chloride in various reactions.

Example I.—Ten g. of isotactic poly(propylene oxide) (molecular weight: 950,000) was dissolved in 400 ml. of benzene and to this was added 6.8 g. of acetic anhydride. The mixture was refluxed for 24 hours and washed thoroughly with distilled water containing a small amount of ammonium hydroxide. The benezene phase was separated and evaporated repeatedly with additions of fresh dry benzene. The product was 5 g. of a colorless waxy solid and infrared (IR) study of the product showed the presence of acetyl groups. An intrinsic viscosity study of the product indicated the molecular weight to be 28,000.

Example II.—Fifty g. of isotactic poly(propylene oxide) (molecular weight: 1,700,000) was dissolved in 1,500 ml. of acetic acid and to this was added 34 g. of acetic anhydride. The mixture was refluxed for 30 hours. The solution was evaporated to a syrup and this was dissolved in 1,500 ml. of benzene. The benzene solution was washed three times with water and the benzene phase was repeatedly evaporated with fresh benzene to give a syrup. The IR study of this syrup showed the presence of acetyl groups. The syrup was dissolved in 1,500 ml. of methanol and to this was added 40 ml. of concentrated hydrochloric acid and the mixture was refluxed for six hours. The reaction mixture was evaporated to a syrup and dissolved in 1,500 ml. of benzene and washed thoroughly with distilled water. The benzene phase was evaporated and dried azeotropically by codistillation with benzene to give 49 g. of waxy product. Infrared study of this product showed the presence of hydroxyl groups and intrinsic viscosity study showed the molecular weight to be 32,000.

The isotactic crystalline poly(propylene oxide) diol (26 g.) was reacted with 25.2 g. of triol and 45.6 g. of touene diisocyanate with a polyurethane catalyst. The urethane product gave, after applying to an iron plate, a very tough transparent coating film. Using the maximum force of a variable Gardner impact tester (160 inch pound) with ⅝" base plate hole, neither flaking nor cracking was observed.

Example III.—Ten g. of isotactic poly(propylene oxide) (molecular weight: 950,000) was dissolved in 400 ml. of acetic anhydride and the mixture was heated to between 100° C. to 139° C. for 24 hours. After reaction, excess acetic anhydride was removed by vacuum distillation and the residue was dissolved in benzene and washed thoroughly by distilled water. The benzene phase was evaporated repeatedly with additions of fresh dry benzene to give 10 g. of waxy paste. Infrared study of the product showed the presence of acetyl groups and the molecular weight observed by intrinsic viscosity method was 5,000.

Example IV.—Five g. of isotactic poly(propylene oxide) was dissolved in 200 ml. of benzene and to this was added 3.4 g. of acetic anhydride and 2 g. of anhydrous aluminum chloride. The mixture was refluxed for 24 hours and then washed thoroughly with distilled water. The benzene phase was evaporated and the waxy product was recrystallized from acetone to give 2.0 g. of white waxy material which also showed good carbonyl absorption on IR spectrum. Both the waxy material and the syrupy material were solvolyzed in absolute methanol using hydrogen chloride for the catalyst to give 1.57 g. of waxy white material and 1.2 g. of transparent syrupy material. Both products showed good hydroxyl group absorption in IR study and no carbonyl groups were observed.

Example V.—Ten g. of isotactic poly(propylene oxide) (molecular weight: 950,000) was dissolved in 400 ml. of benzene and to this was added 6.8 g. of acetic anhydride and 4.0 g. of anhydrous aluminum chloride. The mixture was refluxed for 24 hours and washed with water. The benzene phase was evaporated to give 9 g. of white waxy product which showed good absorption of acetyloxy group by IR study. The intrinsic viscosity study indicated the molecular weight to be 10,000.

Example VI.—This example was carried out the same as Example V but was refluxed 48 hours. After the same treatment, it gave 10 g. of brown colored waxy product which also showed the presence of O-acetyl group by IR study. Intrinsic viscosity of the product indicated the molecular weight to be 3,600. The molecular weight of the starting polymer was 950,000.

Example VII.—This experiment was carried out the same as Example V except that 20.4 g. of acetic anhydride was used. After the 24-hour reaction, it gave 10 g. of pale brown colored waxy product which also showed the presence of O-acetyl group by IR study. From the intrinsic viscosity, the molecular weight was found to be 3,350. The molecular weight of the starting polymer was 950,000.

Poly(alkylene oxides), for example, polymers of propylene oxide, ethylene oxide, isobutylene oxide, styrene oxide and epichlorohydrin are cleaved by the process of my invention to isotactic or atactic poly(alkylene oxide) diacetates.

I claim:

1. A method for preparing a poly(alkylene oxide) diacetate in the molecular weight range of 1,000 to 32,000 which comprises: refluxing a poly(alkylene oxide) with acetic anhydride to effect cleavage of said poly(alkylene) oxide.

2. A method for preparing a poly(alkylene oxide) diacetate according to claim 1 with the additional element of refluxing the poly(alkylene oxide) with the acid anhydride in the presence of acetic acid or aluminum chloride.

3. A method for preparing an isotactic poly(alkylene oxide) diacetate according to claim 2.

4. A method for preparing an isotactic poly(propylene oxide) diacetate according to claim 3.

5. A method as in claim 4 wherein the reaction is refluxed in the presence of acetic anhydride and aluminum chloride.

6. A method as in claim 4 wherein the reaction is refluxed in the presence of acetic anhydride and acetic acid.

7. A method as in claim 4 wherein the reaction is refluxed for from 1 to 48 hours.

8. A method as in claim 4 wherein the reaction is refluxed for about 24 hours.

9. A method for preparing an isotactic poly(propylene oxide) diol in the molecular weight range of 1,000 to 32,000 which comprises:

refluxing an isotactic poly(propylene oxide) with acetic anhydride in the presence of acetic acid or aluminum chloride to obtain an isotactic poly(propylene oxide) diacetate to effect cleavage of said poly(propylene oxide), alcoholyzing the diacetate with a lower aliphatic alcohol and isolating the poly(propylene oxide) diol product.

10. A method as in claim 9 wherein cleaving is accomplished by refluxing the isotactic poly(propylene oxide) with acetic anhydride for about from 1 to 35 hours and the resulting diacetate is alcoholyzed with methanol.

References Cited

UNITED STATES PATENTS

| 2,030,835 | 2/1936 | Cox et al. | 260—496 |
|---|---|---|---|
| 2,886,600 | 5/1959 | Horsley et al. | 260—496 |
| 2,481,278 | 9/1949 | Ballard et al. | 260—496 |
| 3,088,970 | 5/1963 | Guest et al. | 260—496 |

OTHER REFERENCES

Whitmore, W. F. et al.; J.A.C.S., 71 (1949) pp. 2427–29.

LORRAINE A. WEINBERGER, Primary Examiner

V. GARNER, Assistant Examiner

U.S. Cl. X.R.

260—77.5 M, 537 P, 615 B